US012566408B2

(12) United States Patent
Matthey-De-L'endroit et al.

(10) Patent No.: US 12,566,408 B2
(45) Date of Patent: Mar. 3, 2026

(54) ACTUATING MECHANISM FOR A FLEXIBLE DISPLAY HAND

(71) Applicant: Montres Breguet S.A., L'Abbaye (CH)

(72) Inventors: Lionel Matthey-De-L'endroit, St-Livres (CH); Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 307 days.

(21) Appl. No.: 18/459,595

(22) Filed: Sep. 1, 2023

(65) Prior Publication Data

US 2024/0085853 A1 Mar. 14, 2024

(30) Foreign Application Priority Data

Sep. 8, 2022 (EP) .................................... 22194637

(51) Int. Cl.
*G04B 19/02* (2006.01)
*G04B 19/04* (2006.01)

(52) U.S. Cl.
CPC ............. *G04B 19/02* (2013.01); *G04B 19/04* (2013.01)

(58) Field of Classification Search
CPC ................................ G04B 19/02; G04B 19/04
See application file for complete search history.

(56) References Cited

U.S. PATENT DOCUMENTS 4,601,585 A * 7/1986 Farley .................. G04B 19/042 368/80
10,444,708 B2 * 10/2019 Cardot .................. G04B 19/00
11,537,080 B2 * 12/2022 Bifrare ................. G04B 13/021
2012/0230163 A1 9/2012 Goeller et al.
2015/0109891 A1 4/2015 Stranczl
2018/0341224 A1 * 11/2018 Alagon Carrillo .. G04B 13/005
2021/0026305 A1 * 1/2021 Stranczl ............... G04B 13/001

FOREIGN PATENT DOCUMENTS

EP 2 863 274 A1 4/2015
EP 2 498 145 B1 7/2017

OTHER PUBLICATIONS

European Search Report issued Jan. 31, 2023 in European Application 22194637.9 filed on Sep. 8, 2022, 3 pages (with English Translation of Categories of Cited Documents).

* cited by examiner

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A mechanism for actuating a flexible display hand including a first drive pipe and a second drive pipe connected to a first end of a second flexible arm, the first and second flexible arms being connected to one another by a tip at their second end, the first pipe being mounted at a defined first prestressing angle, and the second pipe being mounted at a defined second prestressing angle in the opposite direction to that of the first pipe, so that the elastically prestressed flexible display hand constantly maintains the entire actuating mechanism under tension during normal operation of the actuating mechanism, the actuating mechanism including a first cannon-pinion onto which the first drive pipe of the flexible display hand is driven.

9 Claims, 9 Drawing Sheets

ACTUATING MECHANISM FOR A FLEXIBLE DISPLAY HAND

CROSS-REFERENCE TO RELATED APPLICATION

This application claims priority to European Patent Application No. 22194637.9 filed on Sep. 8, 2022, the entire disclosure of which is hereby incorporated herein by reference.

TECHNICAL FIELD OF THE INVENTION

The present invention relates to an actuating mechanism for a flexible display hand.

TECHNOLOGICAL BACKGROUND

The present invention relates to flexible display hands. Such hands, which are already known in the prior art, comprise a first drive pipe connected to a first end of a first flexible arm, and a second drive pipe connected to a first end of a second flexible arm. At their second end, the first and second flexible arms are connected to one another by a tip. In a non-stressed, free state of the flexible display hand, the first and second drive pipes are spaced apart. Conversely, an operating position in which the flexible display hand has a defined shape and length is a stressed position in which the first drive pipe and the second drive pipe are arranged coaxially around the same axis of rotation. In this stressed position, the first drive pipe is mounted at a defined first prestressing angle, and the second drive pipe is mounted at a defined second prestressing angle in the opposite direction to that of the first drive pipe. The flexible display hand is arranged to change shape and length in a desired manner as the angular position of the second drive pipe varies relative to the angular position of the first drive pipe by pivoting about the axis of rotation. To this end, the first flexible arm of the flexible display hand undergoes an angular rotation $\theta\mathbf{1}$ which is applied by a horological movement to the flexible display hand in order to display the information. For the second flexible arm, since the angular rotation $\theta\mathbf{1}$ applied by the horological movement to the flexible display hand is modulated by an angle of rotation $\varphi$ by an actuating mechanism, this angle of rotation $\varphi$, applied to the second flexible arm of the flexible display hand, determines the rotation and change in shape and length of the flexible display hand.

Mechanisms for actuating a flexible, variable-length display hand are already known in the prior art. These various actuating mechanisms are all based on the same operating principle: an angular rotation $\theta\mathbf{1}$, applied to an input of the actuating mechanism by the horological movement, is modulated by an angle of rotation $\varphi$ by this actuating mechanism, this angle of rotation $\varphi$, which is applied in an opposite direction to the first and second flexible arms of the flexible display hand, determining the rotation and change in shape and length of the flexible display hand.

With these prior art drive mechanisms, the flexible display hands trace paths of various shapes (circular, oval, triangular etc.) in a single revolution; in other words, from a given starting point, the flexible display hands make a complete revolution, deforming themselves in the desired way, then return to their starting point and the process starts all over again.

SUMMARY OF THE INVENTION

The purpose of the present invention is to provide an actuating mechanism for a flexible display hand enabling the paths traced by such a flexible display hand to be varied when the flexible display hand is driven by such an actuating mechanism.

To this end, the present invention relates to a mechanism for actuating a flexible display hand comprising a first drive pipe connected to a first end of a first flexible arm, and a second drive pipe connected to a first end of a second flexible arm, the first and second flexible arms being connected to one another by a tip at their second end, the first pipe being mounted at a defined first prestressing angle, and the second pipe being mounted at a defined second prestressing angle in the opposite direction to that of the first pipe, so that the elastically prestressed flexible display hand constantly maintains the entire actuating mechanism under tension during normal operation of the actuating mechanism, the actuating mechanism comprising a first cannon-pinion onto which the first drive pipe of the flexible display hand is driven, this first cannon-pinion being driven by a horological movement, this first cannon-pinion driving an intermediate wheel set which in turn drives a second cannon-pinion onto which the second drive pipe is driven, the flexible display hand moving between an initial position and a final position in which it makes a jump to return to its initial position, the flexible display hand changing shape and length in a desired way during this movement, which induces additional elastic tension induced by the change in angular position of the second drive pipe relative to the first drive pipe, which is added to the elastic tension induced by the mounting of the first and second drive pipes on the respective first and second cannon-pinions, the kinematic link between the intermediate wheel set and the second cannon-pinion being momentarily interrupted at the time when the flexible display hand makes its jump, the second cannon-pinion then being temporarily free to rotate about itself and disconnected from the rest of the actuating mechanism, so that the additional elastic tension is released, causing the second cannon-pinion to pivot, the first and second cannon-pinions then being directly engaged via the pin, which precisely positions the second cannon-pinion relative to the first cannon-pinion 14, so that the first cannon-pinion drives not only the second cannon-pinion, but also the intermediate wheel set, until such time as the second cannon-pinion is again engaged with the intermediate wheel set. The position of the pin ensures that the drive is resumed correctly, preventing the tips from mutually blocking one another.

According to particular embodiments of the invention:

- the intermediate wheel set comprises a first and a second intermediate wheel, the second intermediate wheel being rotationally coupled with the first intermediate wheel, the first cannon-pinion driving the first intermediate wheel, whereas the second intermediate wheel drives the second cannon-pinion;
- the second cannon-pinion is provided with a pin which projects into a slot cut in the plate of the first cannon-pinion, the second intermediate wheel having, at a place on its perimeter, a toothless sector;
- the slot, which is in the shape of an arc of a circle centred on the centre of the first cannon-pinion, is delimited at its two ends by a first and a second back;
- the slot extends over an angular sector determined by the desired change in shape and length of the flexible display hand, to which an additional angular sector must be added to take account of the overall dimensions of the pin;
- the angle $\alpha_{Aig}$ formed by the bisector of the first and second flexible arms that extends between an axis of rotation of the first and second drive pipes and the tip of the flexible display hand, with the direction of the bisector when the flexible display hand is in its initial position, is given by:

$$\alpha_{Aig} = \frac{\theta 1 \cdot (1+i)}{2}$$

where

θ1 is the angular rotation applied by the horological movement to the first flexible arm of the flexible display hand from its initial position;

i is the gear ratio between the first and second flexible arms of the flexible display hand.

Thanks to these features, the present invention provides an actuating mechanism arranged to drive a flexible display hand through, for example, two complete revolutions, the second revolution having a different geometry to the first. From a given initial starting point, the flexible display hand makes a first revolution, then a second revolution after the first before returning to its initial starting point and repeating the path again. The actuating mechanism according to the invention is also distinguished by its simplicity and low height.

According to particular implementations of the invention, the actuating mechanism comprises a friction clutch intended to be arranged between a hand-setting mechanism capable of being controlled by a winding button, and the first cannon-pinion, the hand-setting mechanism and the winding button being comprised in the horological movement, the friction clutch being configured such that, when the winding button is in a hand-setting position and is operated in order to move the flexible display hand in the clockwise direction, it transmits a torque to the first cannon-pinion in order to drive said flexible display hand in the clockwise direction.

According to particular implementations of the invention, the friction clutch is configured such that, when the winding button is operated, when it is in the hand-setting position, in order to move the flexible display hand in the counter-clockwise direction, it slides when it is subjected to a torque above a predefined threshold.

According to particular implementations, the first and second cannon-pinions are directly engaged via the pin, which precisely positions the second cannon-pinion relative to the first cannon-pinion, so that the first cannon-pinion drives not only the second cannon-pinion, but also the intermediate wheel set until such time as the second cannon-pinion is again engaged with the intermediate wheel set, the position of the pin ensuring that the drive is resumed correctly, preventing the tips from mutually blocking one another.

BRIEF DESCRIPTION OF THE FIGURES

Other features and advantages of the present invention will be better understood upon reading the following detailed description of one embodiment of the actuating device according to the invention, said example being provided for the purposes of illustration only and not intended to limit the scope of the invention, given with reference to the accompanying drawing, in which.

DETAILED DESCRIPTION OF THE INVENTION

The present invention was drawn from the general inventive idea consisting of procuring, in a horological movement, an actuating mechanism for a flexible display hand that allows the paths traced by such a flexible display hand to be varied. More specifically, the actuating mechanism according to the invention is designed to drive a flexible display hand such that this flexible display hand, starting from an initial starting point, successively makes a first, then a second revolution, the geometry whereof is different to that of the first revolution, before returning to its initial starting point at the end of its second revolution and repeating the same path again. One of the advantages of the present invention lies in the fact that different value ranges for the variable displayed on each of the first and second revolutions can be displayed. The actuating mechanism according to the invention is also very simple and occupies very little height.

The embodiment of the actuating mechanism according to the invention which will be described hereinbelow merely by way of a non-limiting example, can allow a 24-hour time indication to be displayed. One typical example involves the display of the current time, where the midnight-midday time slot can be displayed during the first revolution, and the midday-midnight time slot during the second revolution.

Figure 1:
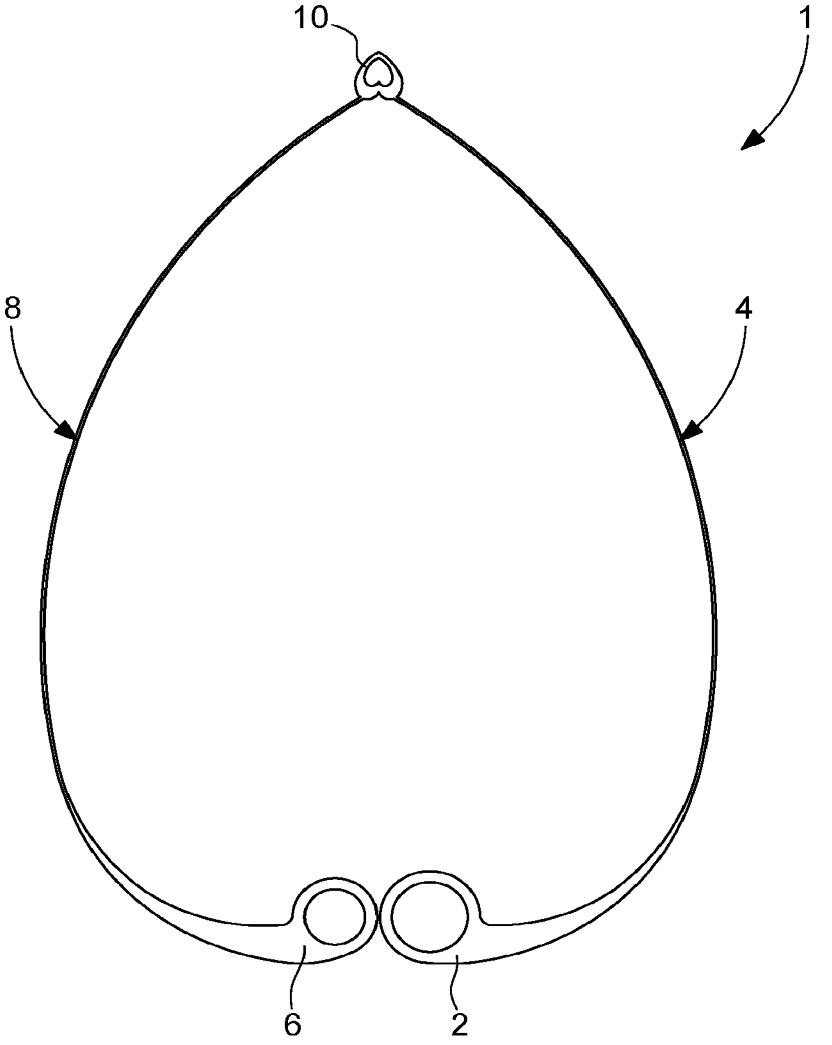
FIG. 1 is a plan view of a flexible display hand intended to be driven by an actuating mechanism according to the invention.

Referred to as a whole by the general reference numeral 1, a flexible display hand capable of being driven by an actuating mechanism according to the invention is illustrated in FIG. 1. This flexible display hand 1 comprises a first drive pipe 2 connected to a first end of a first flexible arm 4, and a second drive pipe 6 connected to a first end of a second flexible arm 8. At their second end, the first and second flexible arms 4 and 8 are connected to one another by a tip

10. In a non-stressed, free state of the flexible display hand 1 illustrated in FIG. 1, the first and second drive pipes 2, 6 are spaced apart.

Figure 2:
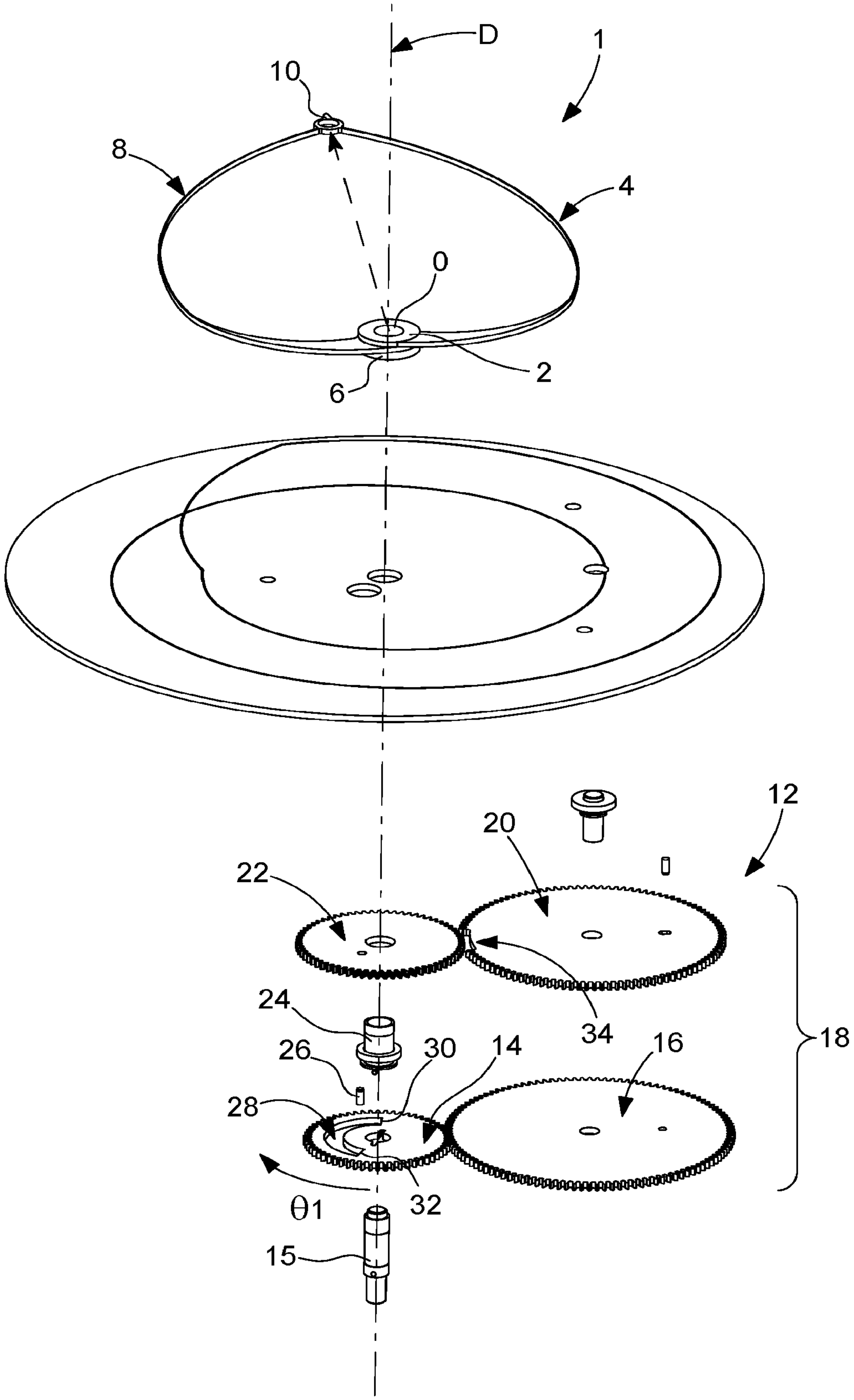
FIG. 2 is a perspective, exploded view of the actuating mechanism according to the invention.

Conversely, an operating position in which the flexible display hand 1 has a defined shape and length is a stressed position in which the first drive pipe 2 and the second drive pipe 6 are arranged coaxially around an axis of rotation D (see FIG. 2). In this stressed position, the first drive pipe 2 is mounted at a defined first prestressing angle, and the second drive pipe 6 is mounted at a defined second prestressing angle in the opposite direction to that of the first drive pipe 2. As will be better understood after reading the description hereinbelow, the flexible display hand 1 is arranged to change shape and length in a desired manner as the angular position of the second drive pipe 6 varies relative to the angular position of the first drive pipe 2 by pivoting about the axis of rotation D.

Referred to as a whole by the general reference numeral 12, one embodiment of a mechanism for actuating the flexible display hand 1 according to the invention is illustrated in FIG. 2. This actuating mechanism 12 comprises a first cannon-pinion 14 onto an arbor 15 whereof the first drive pipe 2 of the flexible display hand 1 is driven. This first cannon-pinion 14 is driven by a horological movement (not shown), for example in the clockwise direction. The horological movement can drive the first cannon-pinion 14 directly or via an interposed gear train.

The first cannon-pinion 14 thus plays a driving role in the operation of the actuating mechanism 12. More specifically, this first cannon-pinion 14 drives a first intermediate wheel 16 of an intermediate wheel set 18 in the counter-clockwise direction. This intermediate wheel set 18 further comprises a second intermediate wheel 20 rotationally coupled with the first intermediate wheel 16 and which thus also rotates in the counter-clockwise direction. Finally, the actuating mechanism 12 comprises a second cannon-pinion 22 rotationally driven in the clockwise direction by the second intermediate wheel 20. This second cannon-pinion 22, which is mounted such that it can rotate freely on the arbor 15 of the first cannon-pinion 14, comprises an arbor 24 onto which the second drive pipe 6 is driven. It will be understood that the meshing between the first and second cannon-pinions 14, 22 on the one hand, and the intermediate wheel set 18 on the other, can take place directly or via additional wheels and pinions.

The actuating mechanism 12 is further characterised in that the second cannon-pinion 22 is provided with a pin 26 which projects into a slot 28 cut into the plate of the first cannon-pinion 14. This slot 28, which is in the shape of an arc of a circle centred on the centre of the first cannon-pinion 14, is delimited at its two ends by a first and a second back 30 and 32 respectively, and extends over an angular sector of 162.5° in the non-limiting example shown in the drawing. This angular sector value is determined by the desired change in shape and length of the flexible display hand 1, to which an additional angular sector must be added to take account of the overall dimensions of the pin 26, for example 20°, as well as a safety margin, typically equal to 2.5°. The drawing further shows that the second intermediate wheel has a toothless sector 34 at one place on its perimeter. The role of these different elements will be described in detail hereinbelow.

By way of illustration only, let us now assume that the first cannon-pinion 14 is driven by the horological movement in the clockwise direction at a rate of one revolution per day. In turn, the first cannon-pinion 14, engaged with the first intermediate wheel 16, rotationally drives the latter in the counter-clockwise direction, which also causes the second intermediate wheel 20 to rotate in the counter-clockwise direction. Finally, the second intermediate wheel 20 drives the second cannon-pinion 22 in the clockwise direction.

Figure 3:
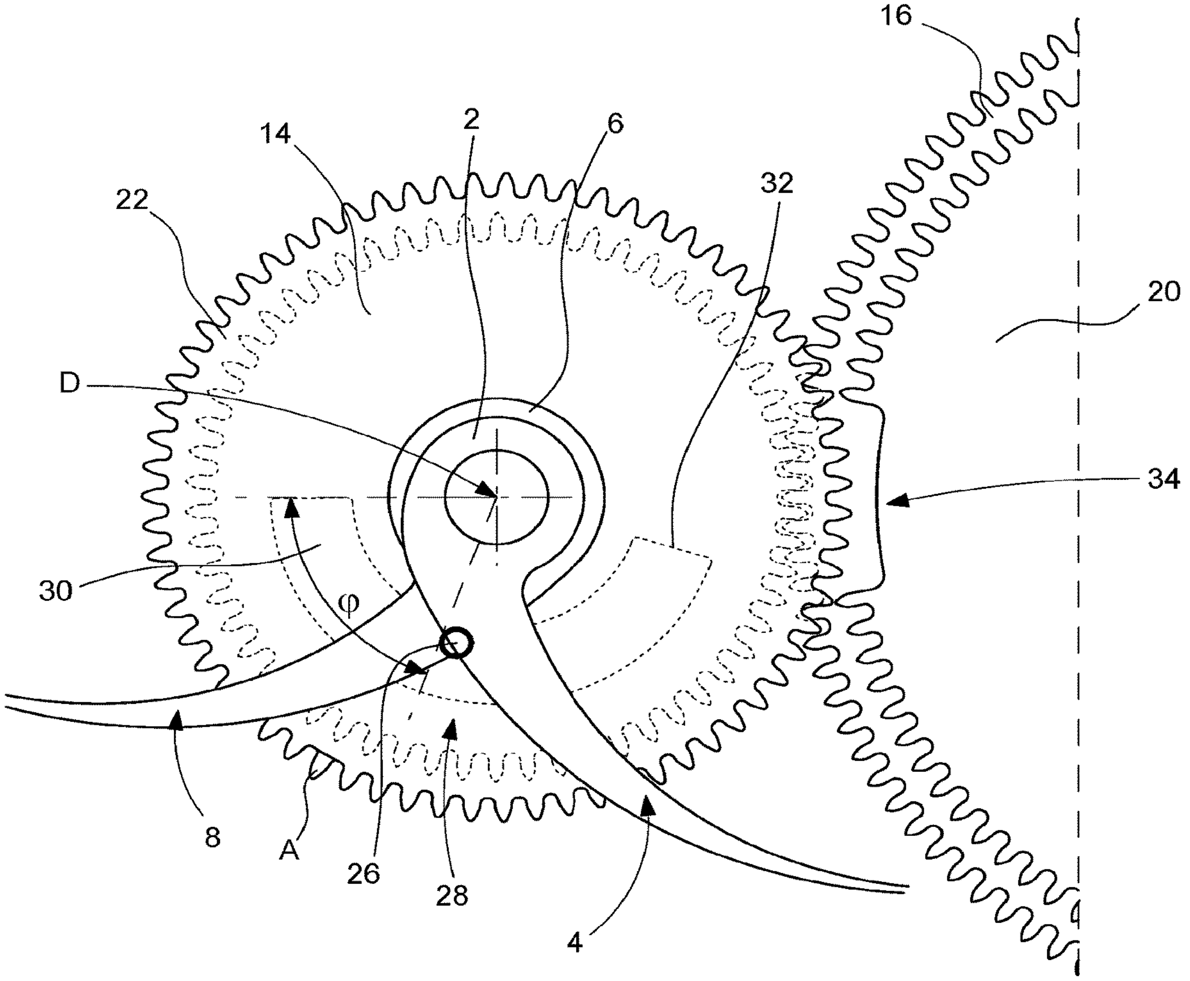
FIG. 3 is a partial, plan view of the actuating mechanism according to the invention in the standard operating mode, wherein a phase angle is created between the first and second flexible arms of the flexible display hand.

Due to the gear ratios between the first and second cannon-pinions 14, 22 and the first and second intermediate wheels 16, 20 which have been chosen here to illustrate the actuating mechanism 12 according to the invention, the second cannon-pinion 22 makes less than one revolution per day (0.799). This causes the first and second flexible arms 4, 8 of the flexible display hand 1 to move away from one another, whereas the pin 26 begins to move into the slot 28. The angular distance φ separating the pin 26 from the first back 30 represents the phase angle applied to the first and second flexible arms 4, 8 of the flexible display hand 1 by the actuating mechanism 12 actuated by the horological movement (see FIG. 3). It should be noted that during normal operation of the actuating mechanism 12, i.e. when the toothless sector 34 of the second intermediate wheel 20 is not facing the second cannon-pinion 22, in other words when the second intermediate wheel 20 and the second cannon-pinion 22 are engaged with one another, the elastically prestressed flexible display hand 1 constantly keeps the entire actuating mechanism 12 under tension, thanks to which the second cannon-pinion 22 is held in position. More specifically, mounting the flexible display hand 1 under stress induces elastic tension therein, which works to bring its flexible arms 4, 8 closer together. In addition to this elastic tension induced by the mounting of the flexible display hand 1 under stress, an additional elastic tension is present, which elastic tension is induced by the change in shape and length of the flexible display hand 1 as a result of the variation in the angular position of the second drive pipe 6 relative to the angular position of the first drive pipe 2 by pivoting about the axis of rotation D.

Figure 4:
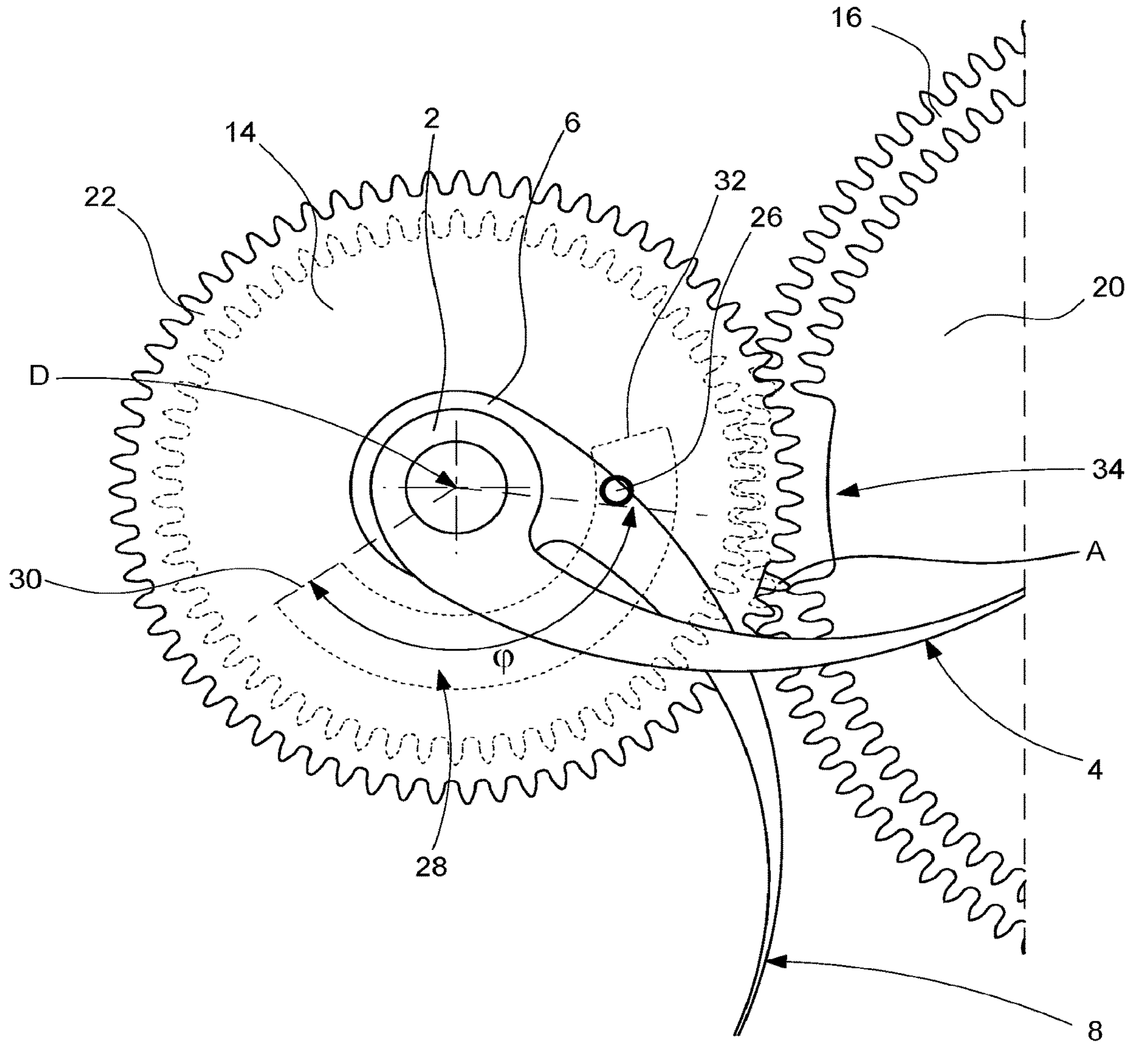
FIG. 4 is a partial, plan view illustrating the situation of the actuating mechanism according to the invention immediately before the flexible display hand makes a jump and where the phase angle between the first and second flexible arms of this flexible display hand is at its maximum, the second cannon-pinion still being engaged with the second intermediate wheel via a last tooth of this second intermediate wheel that precedes the toothless sector.
Figure 5:
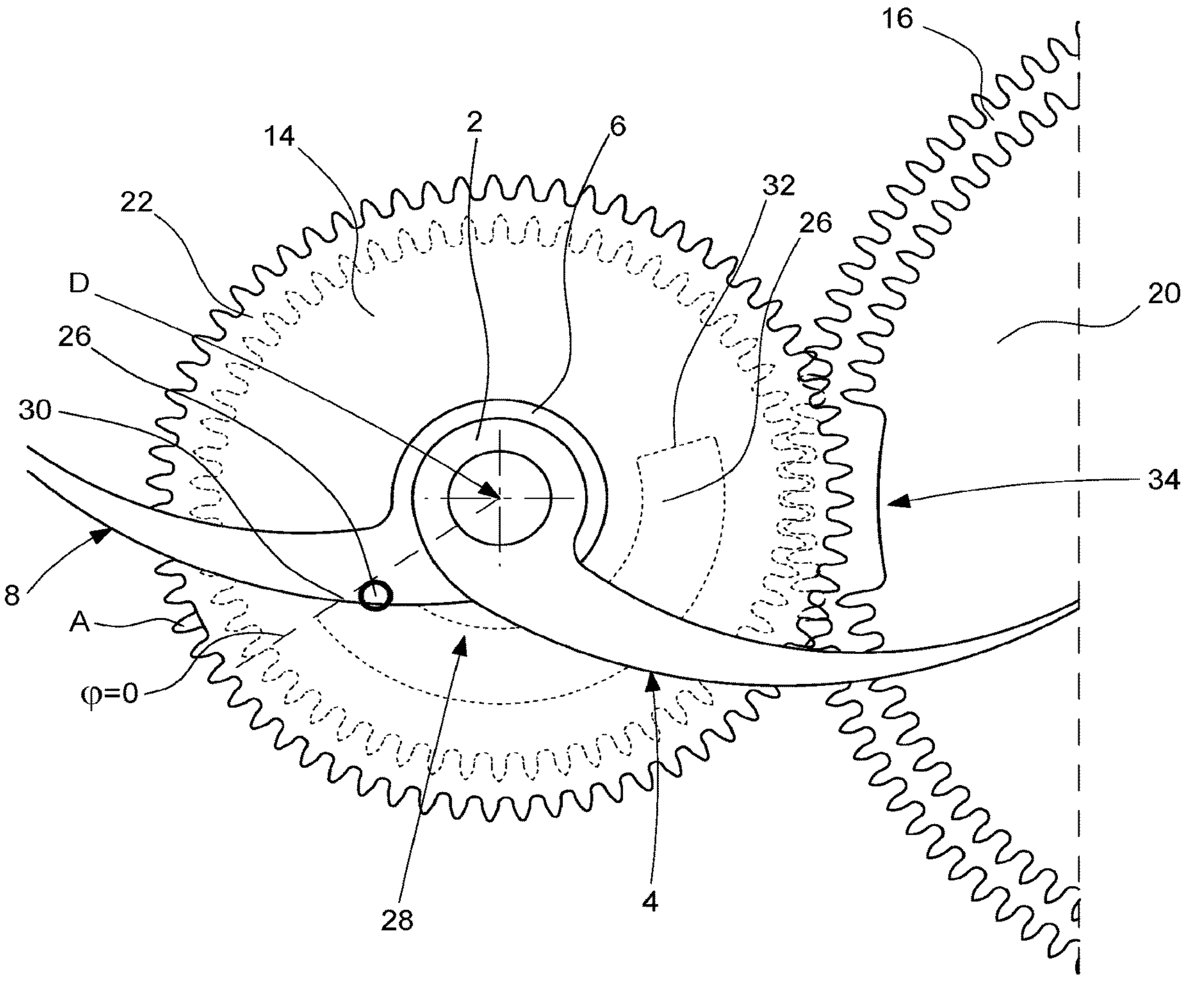
FIG. 5 is a partial, plan view illustrating the situation of the actuating mechanism according to the invention immediately after the flexible display hand has made its jump and the phase angle between the first and second flexible arms is zero, with the second cannon-pinion still not being engaged with the second intermediate wheel, but being directly engaged with the first cannon-pinion via a pin.
Figure 6:
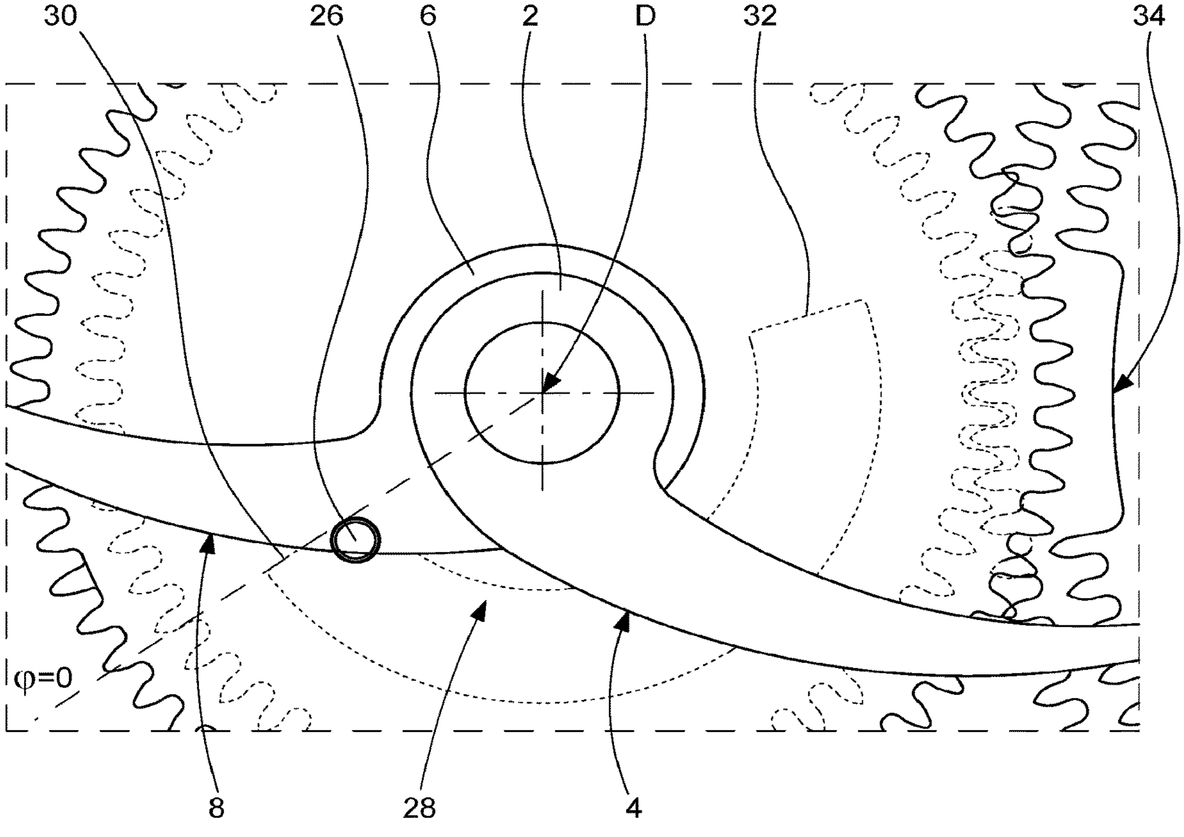
FIG. 6 is a close-up view of FIG. 5 shown to a larger scale.
Figure 7:
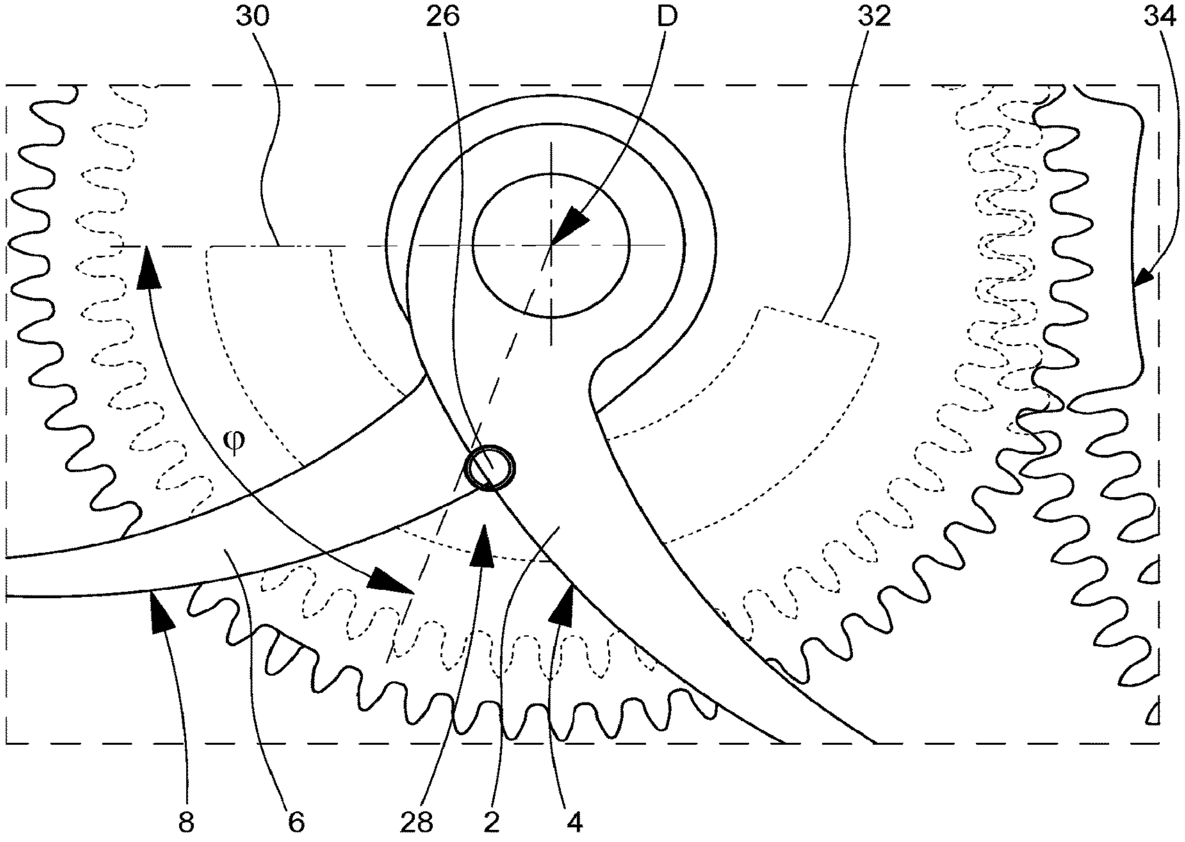
FIG. 7 is a close-up view of FIG. 3 shown to a larger scale.

When, at the end of the second revolution of the flexible display hand 1, the toothless sector 34 of the second intermediate wheel 20 comes to face the second cannon-pinion 22, as illustrated in FIG. 4, this second cannon-pinion 22 will be temporarily free to rotate about itself and will be disconnected from the rest of the actuating mechanism 12. More specifically, as shown in FIG. 4, which illustrates the situation of the actuating mechanism 12 immediately before the flexible display hand 1 makes a jump, the second cannon-pinion 22, which is working to rotate in the clockwise direction to make up for the phase angle φ separating it from the first cannon-pinion 14, remains engaged with the second intermediate wheel 20 via a last tooth A. Subsequently, the second intermediate wheel 20 continues to rotate in the counter-clockwise direction until the last tooth A, by means whereof the second cannon-pinion 22 remained engaged with the second intermediate wheel 20, moves aside and the toothless sector 34 of this second intermediate wheel 20 comes to face the second cannon-pinion 22. This has the immediate consequence of releasing the additional elastic tension induced by the change in angular position of the second drive pipe 6 relative to the first drive pipe 2, causing the second flexible arm 8 to relax and the second cannon-pinion 22 to pivot in the clockwise direction. The second cannon-pinion 22 thus makes up for the phase angle φ which separated it from the first cannon-pinion 14 and which had reached 140° by the end of the second revolution of the flexible display hand 1. More specifically, the slot extends over 162.5°, but the second cannon-pinion 22 only rotates 140°. During this catch-up period, the pin 26 abuts against the back 30 of the slot 28 and the phase angle φ between the first and second cannon-pinions 14, 22 is cancelled out (see FIG. 5). After this jump, the toothless sector 34 of the second intermediate wheel 20 remains facing the second cannon-pinion 22, which thus remains free. However, the elastic tension to which the flexible display hand 1 is subjected holds the pin 26 at the back 30 of the slot 28, such that the first and second cannon-pinions 14, 22 are rotationally coupled. Still being driven by the horological movement, the first cannon-pinion 14 rotates and in turn drives the second cannon-pinion 22. As these first and second cannon-pinions 14, 22 are directly engaged with one another and there is no gear ratio therebetween, these two cannon-pinions 14, 22 rotate at the same speed. As a result, during this operating phase of the actuating mechanism 12, the path of the flexible display hand 1 is circular.

It goes without saying that, when rotating, the first cannon-pinion 14 drives not only the second cannon-pinion 22, but also the first and second intermediate wheels 16, 20. At some point, the second cannon-pinion 22 thus comes into contact with the second intermediate wheel 20. A change in the driving of the second cannon-pinion 22 thus occurs at this point: the second cannon-pinion 22 goes from being directly engaged with the first cannon-pinion 14, to being once again driven in the standard manner by the second intermediate wheel 20.

Adjusting the position of the pin 26 is crucial because it ensures that, when the drive is resumed, the second cannon-pinion 22 meshes with the second intermediate wheel 20 without the tips mutually blocking one another.

It is important to note that the driving torque supplied by the horological movement is applied to the first cannon-pinion 14 with which the first flexible arm 4 of the flexible display hand 1 is associated. As a result, considering the bisector of the first and second flexible arms 4, 8 which extends between the axis of rotation D of the first and second drive pipes 2 and 6, when they are in the operating position, and the tip 10 of the flexible display hand 1, the angle $\alpha_{Aig}$ formed by this bisector with the direction of the bisector when the flexible display hand 1 is in its initial position which, in the purely illustrative and non-limiting example shown in the drawing, corresponds to the 6 o'clock-12 o'clock axis, does not coincide exactly with the angular rotation θ1 applied by the horological movement to the first flexible arm 4 of the flexible display hand 1. In other words, the mathematical relationship between the angle $\alpha_{Aig}$ and the angle 81 is given by:

$$\alpha_{Aig} = \frac{\theta 1 \cdot (1 + i)}{2}$$

where

- $\alpha_{Aig}$ is the angle formed by the bisector of the first and second flexible arms that extends between the axis of rotation D and the tip of the flexible display hand, with the direction of the bisector when the flexible display hand is in its initial position;
- θ1 is the angular rotation applied by the horological movement to the first flexible arm of the flexible display hand from its initial position;
- i is the gear ratio between the first and second flexible arms of the flexible display hand (0.799 in the present case).

It goes without saying that the present invention is not limited to the embodiment described hereinabove and that various simple alternatives and modifications can be considered by a person skilled in the art without leaving the scope of the invention as defined by the accompanying claims.

In the example described hereinabove, from its starting point to the time at which it makes its jump back to its initial position, the tip 10 of the flexible display hand 1 traces a spiral path over two revolutions (see FIG. 8). In other words, while the first and second cannon-pinions 14, 22 make two complete revolutions between two consecutive jumps of the flexible display hand 1, the second intermediate wheel 20 makes one complete revolution, since the return of the flexible display hand 1 to its initial position occurs when the toothless sector 34 of the second intermediate wheel 20 is facing the second cannon-pinion 22.

Figure 9:
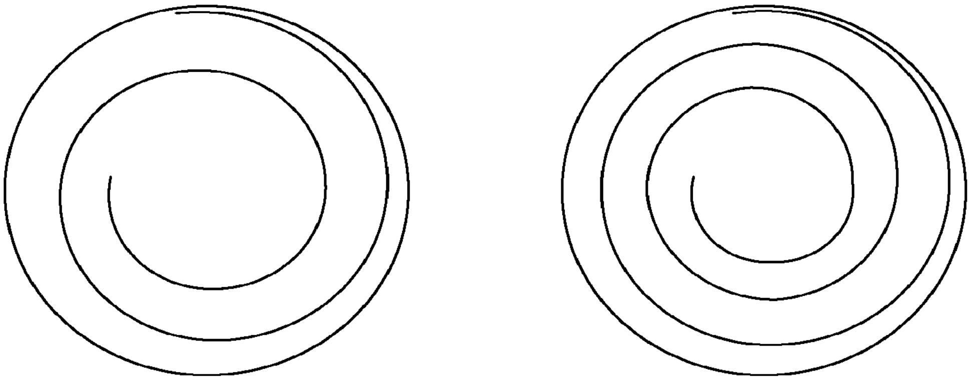
Figure 10:
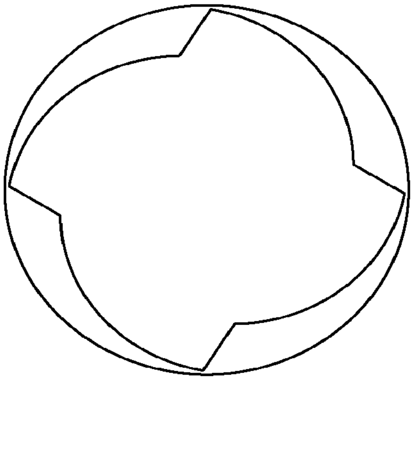

It goes without saying that, as shown in FIG. 9, by adapting the pitch between turns and the number of turns, other paths of the tip 10 of the flexible display hand 1 can be envisaged. Similarly, with reference to FIG. 10, the actuating mechanism 12 according to the invention can be arranged such that the flexible display hand 1 makes a plurality of jumps during each revolution.

Figure 8:
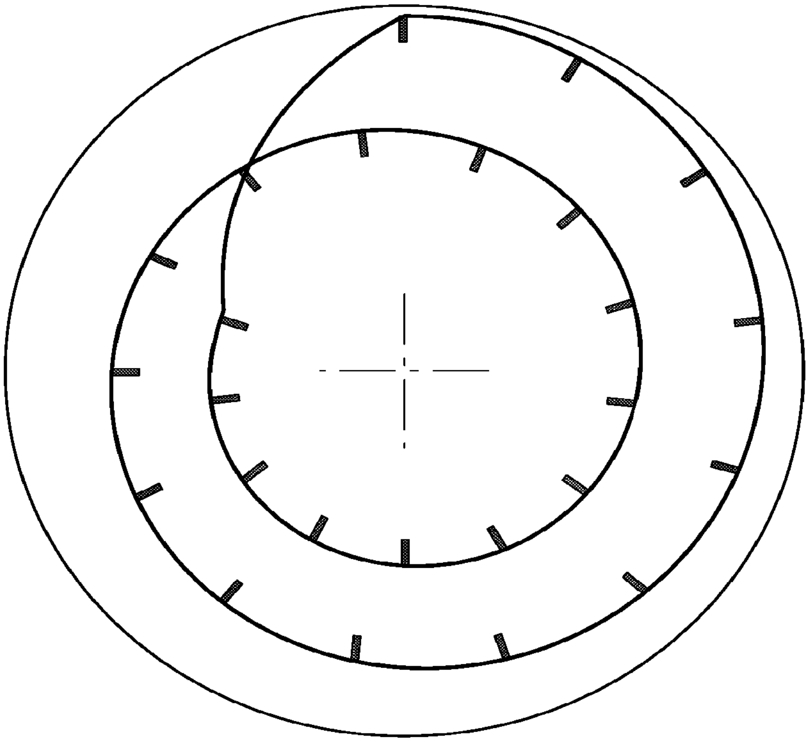
FIGS. 8, 9 and 10 illustrate different path types that can be considered for the flexible display hand driven by the actuating mechanism according to the invention.

As a result of the elastic tension of the hand, any attempt to move the flexible display hand 1, when setting the hands, in order to make a jump to move from the initial position to the final position, i.e. to make the jump in the counter-clockwise direction when referring to FIGS. 2 and 8, would result in the actuating mechanism 12 becoming blocked or damaged.

In order to prevent such a situation from occurring, the actuating mechanism 12 comprises a friction clutch 41 intended to be arranged between the first cannon-pinion 14 and a hand-setting mechanism 42 comprising a dial train controlled by a winding button 43. These features are diagrammatically shown in FIGS. 11 and 12.

The hand-setting mechanism 42 and the winding button 43 are comprised in the horological movement in which the actuating mechanism 12 according to the invention is intended to be arranged and are known as such to a person skilled in the art.

In a known manner, the winding button 43 is capable of controlling the hand-setting mechanism 42, i.e. of acting thereon, when it is in a hand-setting position.

Figure 11:
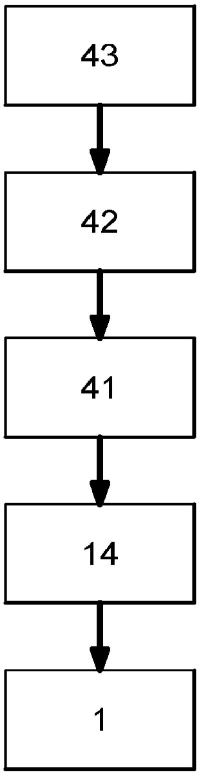
FIG. 11 shows a block diagram of the actuating mechanism according to the invention, wherein a winding button is operated in order to move the flexible display hand in the clockwise direction.

After the winding button 43 is operated when it is in the hand-setting position, in order to move the flexible display hand 1 in the clockwise direction, the friction clutch 41 is configured to transmit, to the first cannon-pinion 14, all or part of a torque to which it is subjected by the hand-setting mechanism 42, in order to drive the flexible display hand 1 in the clockwise direction. This scenario is shown in FIG. 11, wherein the transmission of movement is symbolised by the arrows shown in a thick dotted line.

When the winding button 43 is operated, when it is in the hand-setting position, in order to move the flexible display hand 1 in the counter-clockwise direction, the friction clutch 41 is configured to slide when it is subjected to a torque above a predefined threshold, in order to prevent a too high torque from being transmitted to the first cannon-pinion 14. The torque reaches this predefined threshold when the flexible display hand 1 is in its initial position and when the winding button 43 is operated in order to drive the hand to make the jump to its final position.

Figure 12:
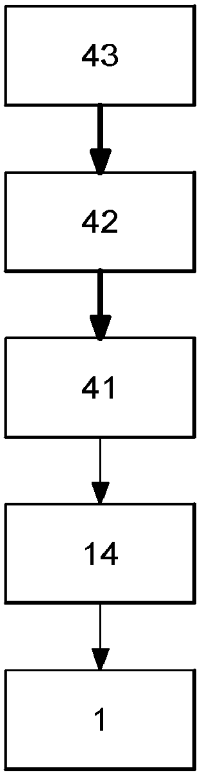
FIG. 12 is similar to FIG. 11, except that the winding button is operated in order to move the flexible display hand in the counter-clockwise direction.

Thus, the friction clutch 41 allows a torque to be transmitted from the winding button 43 to the first cannon-pinion 14 in order to move the flexible display hand 1, in the counter-clockwise direction, from its final position to its initial position, however interrupts this transmission of torque when it is in its initial position. This arrangement thus prevents the actuating mechanism 12 from becoming blocked or from breaking in any way, which would happen if the flexible display hand 1 attempted to make a jump from its initial position to its final position. This scenario is shown in FIG. 12, wherein the arrows shown in thin dotted lines represent the non-transmission of movement.

The friction clutch 41 can be formed by any clutch known to a person skilled in the art, such as a metal foil, a clutch with arms, a friction drive wheel, etc., and is arranged in the dial train. In particular, the friction clutch 41 is located between a sliding pinion and the first cannon-pinion 14 and is thus not actuated when the movement is wound manually, which involves a winding pinion through to a ratchet wheel known as such to a person skilled in the art.

In a manner known to a person skilled in the art, the horological movement further includes a hand-setting clutch, not shown in the figures, intended to be arranged between the first cannon-pinion 14 and a going train. Such a hand-setting clutch allows, when setting the hands, the first cannon-pinion 14 to be uncoupled, beyond a certain torque threshold, from the going train so as not to damage the going train or a kinematic escapement connected to the going train.

NOMENCLATURE

1. Flexible display hand
2. First drive pipe
4. First flexible arm
6. Second drive pipe
8. Second flexible arm
10. Tip
D Axis of rotation
12. Actuating mechanism
14. First cannon-pinion
15. Arbor
16. First intermediate wheel
18. Intermediate wheel set
20. Second intermediate wheel
22. Second cannon-pinion
24. Arbor
26. Pin
28. Slot
30. First back
32. Second back
34. Sector
41. Friction clutch
42. Hand-setting mechanism
43. Winding button

The invention claimed is:

1. A mechanism for actuating a flexible display hand comprising a first drive pipe connected to a first end of a first flexible arm, and a second drive pipe connected to a first end of a second flexible arm, the first and second flexible arms being connected to one another by a tip at their second end, the first pipe being mounted at a defined first prestressing angle, and the second pipe being mounted at a defined second prestressing angle in the opposite direction to that of the first pipe, so that the elastically prestressed flexible display hand constantly maintains the entire actuating mechanism under tension during normal operation of the actuating mechanism, the actuating mechanism comprising a first cannon-pinion onto which the first drive pipe of the flexible display hand is driven, said first cannon-pinion being driven by a horological movement, said first cannon-pinion driving an intermediate wheel set which in turn drives a second cannon-pinion onto which the second drive pipe is driven, the flexible display hand moving between an initial position and a final position in which it makes a jump to return to its initial position, the flexible display hand changing shape and length during said movement, which induces additional elastic tension induced by the change in angular position of the second drive pipe relative to the first drive pipe which is added to the elastic tension induced by the mounting of the first and second drive pipes on the respective first and second cannon-pinions, a kinematic link between the intermediate wheel set and the second cannon-pinion being momentarily interrupted at a time when the flexible display hand makes its jump, the second cannon-pinion then being temporarily free to rotate about itself and disconnected from the rest of the actuating mechanism, so that the additional elastic tension is released, causing the second flexible arm to relax and the second cannon-pinion to pivot, the first and second cannon-pinions then being directly engaged via a pin in a slot, the first cannon-pinion driving not only the second cannon-pinion, but also the intermediate wheel set, until such time as the second cannon-pinion is again engaged with the intermediate wheel set.

2. The actuating mechanism according to claim 1, wherein the intermediate wheel set comprises a first and a second intermediate wheel, the second intermediate wheel being rotationally coupled with the first intermediate wheel, the first cannon-pinion driving the first intermediate wheel, whereas the second intermediate wheel drives the second cannon-pinion.

3. The actuating mechanism according to claim 2, wherein the second cannon-pinion is provided with the pin which projects into the slot cut in a plate of the first cannon-pinion, the second intermediate wheel having, at a place on its perimeter, a toothless sector.

4. The actuating mechanism according to claim 3, wherein the slot, which is in the shape of an arc of a circle centred on the centre of the first cannon-pinion, is delimited at its two ends by a first and a second back.

5. The actuating mechanism according to claim 4, wherein the slot extends over a predetermined angular sector, to which an additional angular sector must be added to take account of overall dimensions of the pin.

6. The actuating mechanism according to claim 3, wherein an angle αAig formed by a bisector of the first and second flexible arms that extends between an axis of rotation of the first and second drive pipe and the tip of the flexible display hand, with the direction of the bisector when the flexible display hand is in its initial position, is given by:

$$\alpha_{Aig} = \frac{\theta 1 \cdot (1 + i)}{2}$$

where

θ1 is an angular rotation applied by the horological movement to the first flexible arm of the flexible display hand from its initial position;

i is a gear ratio between the first and second flexible arms of the flexible display hand.

7. The actuating mechanism according to claim 1, wherein the actuating mechanism comprises a friction clutch intended to be arranged between a hand-setting mechanism capable of being controlled by a winding button, and the first cannon-pinion, the hand-setting mechanism and the winding button being comprised in the horological movement, the friction clutch being configured such that, when the winding button is in a hand-setting position and is operated in order to move the flexible display hand in the clockwise direction, it transmits a torque to the first cannon-pinion in order to drive said flexible display hand in the clockwise direction.

8. The actuating mechanism according to claim 7, wherein the friction clutch is configured such that, when the winding button is operated, when it is in the hand-setting position, in order to move the flexible display hand in the counter-clockwise direction, it slides when it is subjected to a torque above a predefined threshold.

9. The actuating mechanism according to claim 1, wherein the first and second cannon-pinions are then directly engaged via the pin, which precisely positions the second cannon-pinion relative to the first cannon-pinion, so that the first cannon-pinion drives not only the second cannon-pinion, but also the intermediate wheel set, until such time as the second cannon-pinion is again engaged with the intermediate wheel set, the position of the pin ensuring that the drive is resumed correctly, preventing the tips from mutually blocking one another.

* * * * *